Feb. 24, 1970   F. P. ELLIOTT ET AL   3,497,608
STRAIN RELIEVING MEANS FOR FLEXIBLE ELECTRICAL CORDS
Filed Dec. 16, 1968                                      3 Sheets-Sheet 1
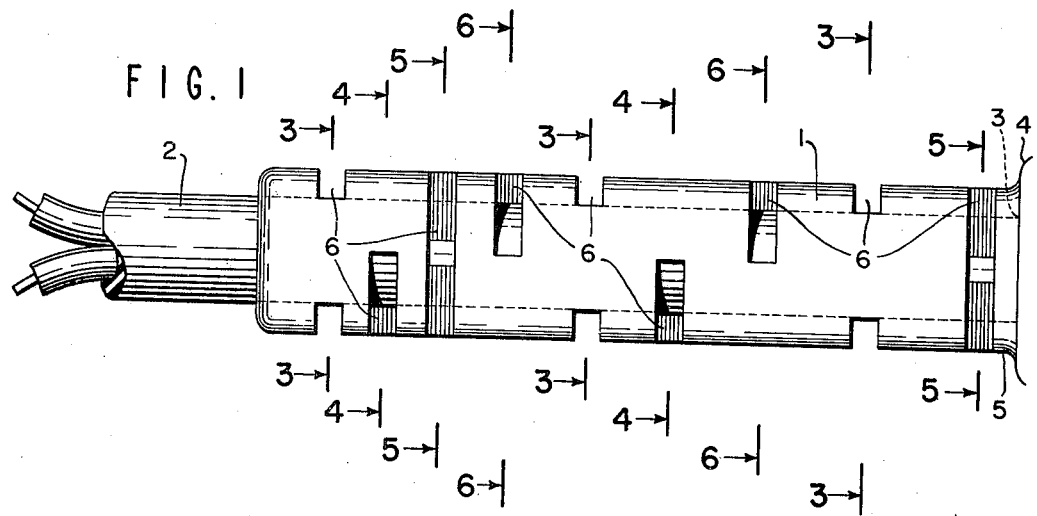
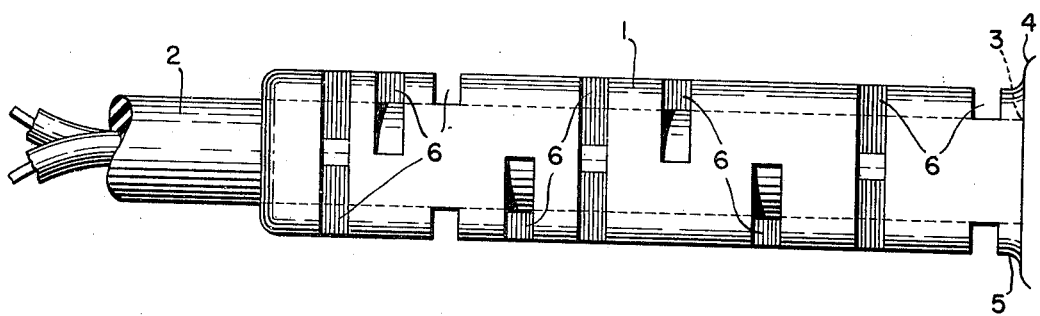
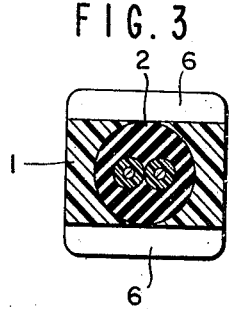 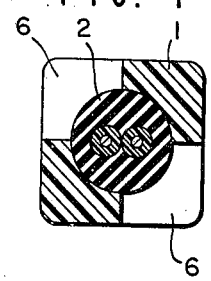 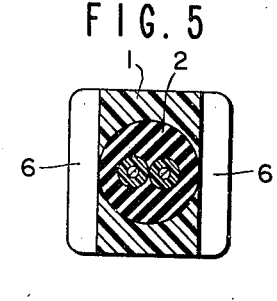 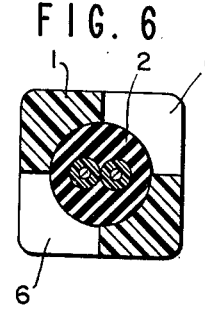
INVENTORS.
FRANKLIN P. ELLIOTT
BY JERRY B. HOFFER
George E. Bodenstein
AGENT.

INVENTORS.
FRANKLIN P. ELLIOTT
JERRY B. HOFFER
BY

AGENT.

Feb. 24, 1970   F. P. ELLIOTT ET AL   3,497,608
STRAIN RELIEVING MEANS FOR FLEXIBLE ELECTRICAL CORDS
Filed Dec. 16, 1968   3 Sheets-Sheet 3

INVENTORS.
FRANKLIN P. ELLIOTT
JERRY B. HOFFER
BY
AGENT.

United States Patent Office 3,497,608
Patented Feb. 24, 1970

3,497,608
STRAIN RELIEVING MEANS FOR FLEXIBLE ELECTRICAL CORDS
Franklin P. Elliott and Jerry B. Hoffer, Denver, Colo., (both c/o Honeywell Inc., Industrial Products Group, 1100 Virginia Drive, Fort Washington, Pa. 19034)
Filed Dec. 16, 1968, Ser. No. 784,060
Int. Cl. H01b 7/04
U.S. Cl. 174—135                                    15 Claims

ABSTRACT OF THE DISCLOSURE

A non-tapered reinforcing sleeve of flexible, resilient material is molded tightly around an electrical cord, with one end of the sleeve located at a point of attachment of the cord at which bending strain is to be relieved. The sleeve is provided with spaced slots having constant size and progressively decreasing spacing with increasing distance from said end, and/or constant spacing and progressively increasing size with increasing distance from said end, for progressively increasing the flexibility of the sleeve with increasing distance from said end.

---

The present invention relates generally to strain-relieving devices, or strain reliefs, for flexible electrical conductor cords, and relates specifically to sleeve-type strain reliefs for relieving bending strain in such cords adjacent to the attachment points thereof.

Strain reliefs of the foregoing type have been known in the past in which the strain-relieving member is a sleeve of resilient material provided with wall openings and surrounding the cord at a portion thereof to be relieved from bending strain, such portion usually being adjacent a point of attachment of the cord. In order to provide the required strain-relieving action, such sleeves have been tapered so that their wall thickness diminishes with increasing distance along the cord from its point of attachment. An example of such a tapered strain-relieving member is found in U.S. Patent No. 3,093,432.

Although the previously known strain-relieving members of the type shown in said patent in general performed their intended function in an acceptable manner, there has nevertheless existed a need for an improved strain-relieving sleeve construction which would not require that the sleeve be tapered, but which would permit the sleeve to have a basically uniform wall thickness and an outer surface which is substantially parallel to the axis of the protected cord. This need has arisen in those instances where manufacturing, molding, and/or material problems have made the tapering of the sleeve, and/or the use of a tapered sleeve, undesirable.

Accordingly, it is an object of the present invention to provide an improved strain relief which fulfills the foregoing need. It is a specific object of the invention to provide such an improved strain relief wherein the strain-relieving sleeve member is not tapered, but has an outer surface which is substantially parallel to the axis of the surrounded cord throughout the length of the sleeve.

In accomplishing these and other equally desirable objects, the improved strain-relieving member provided in accordance with the present invention comprises a sleeve formed of a flexible resilient material having a basically uniform thickness. Thus, the sleeve has an outer surface which is substantially parallel to the axis of the surrounded cord throughout the length of the sleeve. This sleeve is made to provide the needed strain relieving action by being provided with a plurality of axially spaced-apart wall apertures which progressively increase the flexibility of the sleeve with increasing distance along the sleeve from the cord attachment point. Such progressive increasing of the sleeve flexibility, or weakening of the sleeve resiliency, is provided in accordance with the present invention by making the apertures of uniform size but making their axial spacing progressively decrease with increasing axial distance from said point, by making the apertures of progressively increasing size with increasing axial distance from said point but spacing the apertures uniformly along the sleeve, or by utilizing a combination of both of these arrangements. In this way, the need for tapering the sleeve is completely eliminated. As used herein, the terms "spacing" and "spaced" refer to the center to center spacing of the apertures.

A better understanding of the present invention may be had from the following detailed description when read in connection with the accompanying drawings, wherein:

FIG. 1 is a top view of an apertured strain-relieving member in accordance with the present invention shown mounted on an electrical cord;

FIG. 2 is a front view of the arrangement of FIG. 1;

Figure 7:
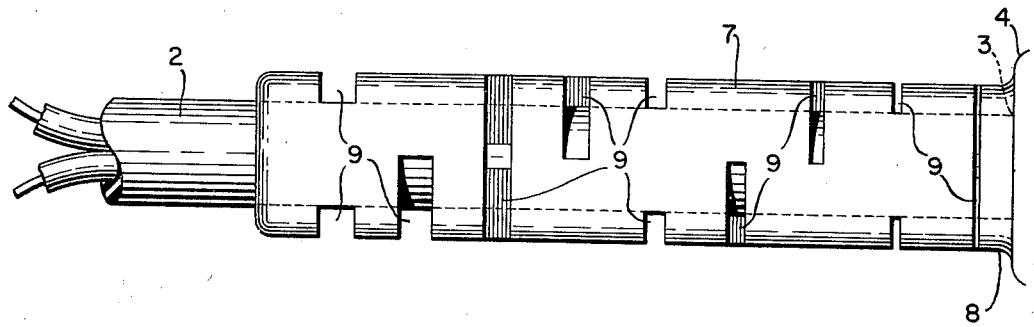
Figure 8:
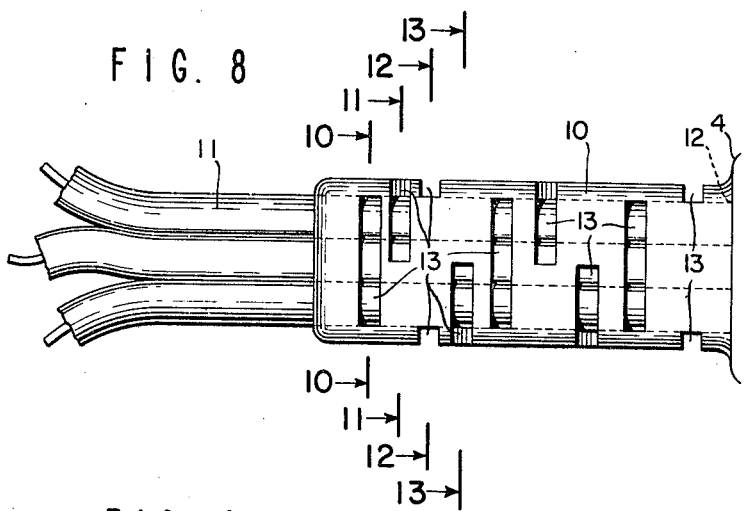
Figure 9:
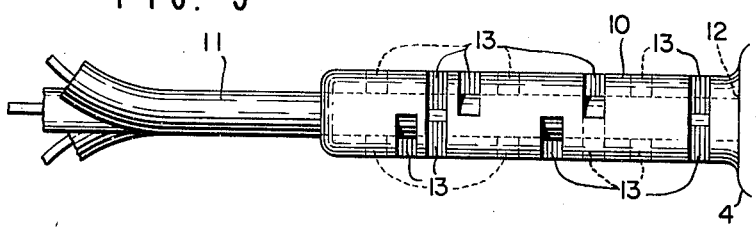
Figure 10:
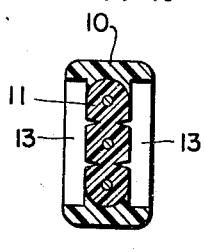
Figure 11:
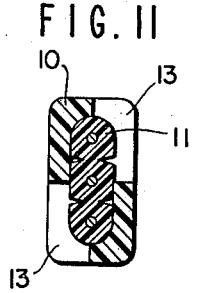
Figure 12:
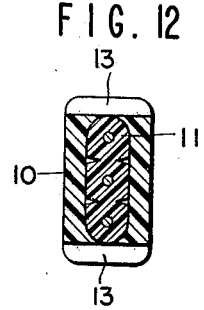
Figure 13:
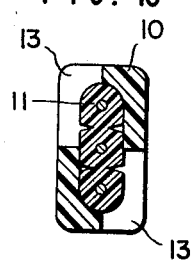
Figure 14:
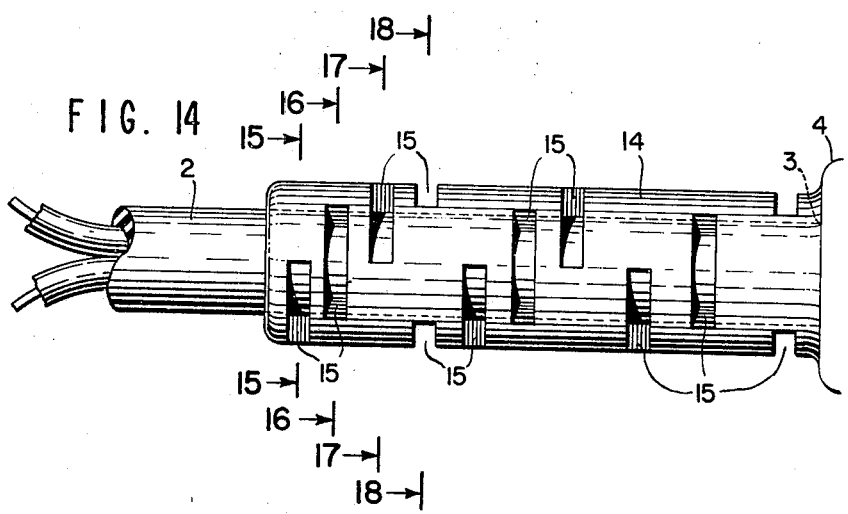
Figure 15:
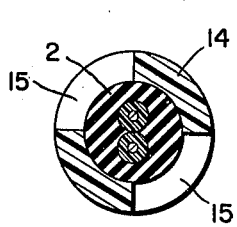
Figure 16:
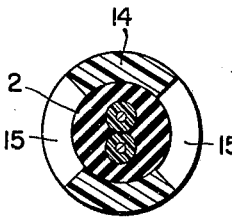
Figure 17:
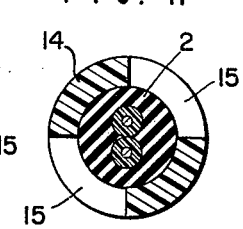
Figure 18:
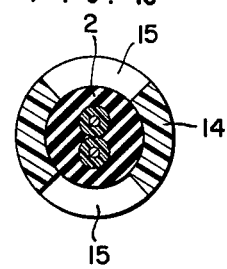

FIGS. 3, 4, 5, and 6 are sectional views taken along the sections lines 3—3, 4—4, 5—5, and 6—6, respectively, of FIG. 1;

FIG. 7 is a top view of a modified form of the member of FIG. 1 having a different aperture arrangement;

FIG. 8 is a top view of a modified form of the member of FIG. 1 having a different cross-sectional shape;

FIG. 9 is a front view of the arrangement of FIG. 8;

FIGS. 10, 11, 12, and 13 are sectional views taken along the section lines 10—10, 11—11, 12—12, and 13—13, respectively, of FIG. 8;

FIG. 14 is a top view of a modified form of the member of FIG. 1 having a still different cross-sectional shape; and FIGS. 15, 16, 17, and 18 are sectional views taken along the section lines 15—15, 16—16, 17—17, and 18—18, respectively, of FIG. 14.

THE EMBODIMENT OF FIGS. 1–6

FIGS. 1 through 6 illustrate an embodiment of the present invention wherein a strain-relieving member in the form of a reinforcing sleeve 1 is basically uniform square cross-section and basically uniform wall thickness is mounted on a flexible electrical conductor cord 2 of circular cross-section. In the view of FIG. 2, the illustrated arrangement has been rotated through 90° from the position which it occupies in the view of FIG. 1.

Referring particularly to FIGS. 1 and 2, the cord 2 is shown as extending to the left from a point or area of attachment 3 to a partially-shown body 4. The body 4 is typically of the less flexible and/or more massive parts to which cords of the type of the cord 2 are usually attached, such as plugs, pieces of electrical equipment, and the like.

The purpose of the sleeve 1 is to relieve the cord 2 from bending strain resulting from the flexing of the cord 2 in the vicinity of the cord attachment point 3. Stated differently, the purpose of the sleeve 1 is to prevent the cord 2 from bending sharply at its point of attachment to the body 4. To this end, the sleeve 1 is formed of a flexible, resilient material, such as an elastomer, of substantially uniform or constant thickness, and is made to surround the cord 2 tightly throughout the length of the sleeve, as by molding the sleeve 1 around the cord 2. Further, one end, 5, of the sleeve 1 (the right-hand end in FIGS. 1 and 2) is positioned or located at the body 4 in the vicinity of the cord attachment point 3. In fact, the sleeve end 5 may well be attached directly to the body 4, as by molding the sleeve 1 and the body 4 as an integral unit.

In order for the sleeve 1 to provide its strain-relieving function, its flexibility must increase, or its resiliency decrease, progressively with increasing distance along the sleeve from the end 5. For this purpose, the sleeve 1 is provided with a plurality of apertures 6 which are so spaced axially along the sleeve 1 that their spacing is an inverse logarithmic function of the distance along the sleeve from the end 5. Thus, this spacing or distance between the apertures progressively diminishes, according to a logarithmic curve, with increasing distance along the sleeve 1 from the end 5. In this way, the sleeve 1 provides the desired strain-relieving action while, as shown, having a substantially uniform basic wall thickness and hence an outer surface which is substantially parallel to the axis of the sleeve 1 and the cord 2.

In the embodiment shown in FIGS. 1 and 2, the aforementioned apertures 6 are in the form of slots of substantially uniform, or equal, width and area or size which pass through the wall of the sleeve 1 from the outer to the inner surface thereof. Moreover, as is made more evident by the views of FIGS. 3 through 6, these slots 6 are spaced or distributed around the periphery or surface of the sleeve 1 in what may be termed a spiral fashion or pattern so as to provide good strain-relieved flexibility for all directions of bending or flexing of the cord 2. Additionally, such positioning of the slots 6 provides a reasonable flow path for the sleeve material when the sleeve 1 is formed by molding it about the cord 2.

THE MODIFICATION OF FIG. 7.

The embodiment of the invention shown in FIG. 7 includes a strain-relieving sleeve 7 which is a modification of the sleeve 1 of the embodiment of FIGS. 1 through 6, but which still exhibits a progressive increase in flexibility with increasing axial distance from its right-hand end 8, as does the sleeve 1. The sleeve 7 is made to produce this action by being provided with a plurality of apertures 9, shown as slots which are distributed around the surface of the sleeve 7 in a spiral pattern as are the slots 6 of the sleeve 1. According to this aspect of the present invention, however, the slots 9 are equally or uniformly spaced along the axis of the sleeve 7, but have a width, and hence an area, which progressively increases as a function of the axial distance along the sleeve 7 from the end 8. This progressively increasing slot width and area, with increasing distance from the end 8, may follow a logarithmic curve as does the spacing of the slots 6 of the sleeve 1. Alternatively, the area of the slots 9 may follow some other curve, as long as the slot area progressively increases with increasing axial distance from the sleeve end 8. In this way, the sleeve 7 is made to provide the desired strain-relieving action while having a basically uniform cross-section and wall thickness, and hence an outer surface which is substantially parallel to the sleeve axis, as in the case of the sleeve 1.

THE MODIFICATION OF FIGS. 8–13

Strain-relieving sleeve members according to the present invention may have cross-sectional shapes which are different from the square shape of the sleeves 1 and 7, and may be used with cords having cross-sectional shapes other than the round shape of the cord 2 of FIGS. 1 through 7. As an example, there is shown in FIGS. 8 through 13 a strain-relieving sleeve 10 of rectangular cross-section which is a modification of the sleeve 1 and which is applied to a cord 11 of rectangular cross-section. The cord 11 is shown as being of the so-called parallel or rip type, and is attached to the body 4 at 12. The sleeve 10 is provided with apertures 13, which are shown as slots spaced axially as are the slots 6 in the sleeve 1, and distributed peripherally in a spiral pattern similar to that for the sleeve 1. As a result, the sleeve 10, like the sleeve 1, has a flexibility which progressively increases with increasing distance from the body 4, while having a basically uniform cross-section and wall thickness, and hence an outer surface which is substantially parallel to the sleeve and cord axis. Also, the illustrated distribution of the slots 13 provides good twisting flexibility for the arrangement of FIGS. 8 though 13.

THE MODIFICATION OF FIGS. 14–18

Another example of a strain-relieving sleeve member having a cross-sectional shape which is different from that of the sleeve 1 is illustrated in FIGS. 14 through 18. In this embodiment of the invention, a sleeve 14 of circular cross-section, which is a modification of the sleeve 1, is applied to the cord 2. The sleeve 14 is provided with apertures 15, which again are shown as slots spaced axially as are the slots 6 in the sleeve 1, and peripherally distributed in a spiral pattern similar to that for the sleeve 1. Accordingly, the sleeve 14, like the sleeve 1, has a flexibility which progressively increases with increasing distance from the body 4, while having a basically uniform cross-secton and wall thickness, and hence an outer surface which is substantially parallel to the sleeve and cord axis.

Although the apertures 13 and 15 in the sleeves 10 and 14, respectively, have been disclosed as being of constant area and variable spacing as for the apertures 6 of the sleeve 1, it should be understood that the apertures 13 and/or 15 could be of variable area and constant spacing as for the apertures 9 of the sleeve 7.

Moreover, while the aperture spacing for the sleeve 1, 10, and 14 has been described as following a logarithmic curve, it is to be understood that other spacing curves can be employed, as long as this spacing progressively diminishes with increasing axial distance from the sleeve end adjacent the cord attachment point. Also, although the variable spaced apertures 6, 13, and 15 have been described as having a uniform area all along their respective sleeves, while the variable area apertures 9 have been described as being uniformly spaced along the sleeve 7, it is to be understood that a combination of these two aspects of the invention may be employed, giving apertures of progressively increasing area having progressively decreased spacing with increasing axial distance from the cord attachment point.

Additionally, although the apertures included in the several illustrated embodiments of the invention are in the form of slots, it is to be understood that these apertures could as well be of other shapes, such as square or round, and/or could extend only partially through the sleeve walls, as long as such apertures are so progressively sized and/or spaced as to give a progressive increase in the sleeve flexibility with increasing distance along the sleeve from the cord attachment point. Also, it is clear that the apertures could be distributed around the sleeves in patterns other than the spiral pattern disclosed herein.

In conclusion, it is seen that the improved strain-relieving members according to the present invention, by virtue of their use of variably sized and/or spaced apertures, provide their intended strain-relieving function without the necessity for any tapering of said members. It is also seen that this is accomplished by causing the width of the space between adjacent apertures to decrease progressively with increasing axial distance from the attachment point of the associated cord.

The embodiments of the invention in which an exclusive property or privilege is claimed are defined as follows:

1. A strain-relieving member comprising a reinforcing sleeve of flexible, resilient material tightly surrounding a flexible electrical conductor cord at a portion thereof to be relieved from bending strain, said sleeve having an outer surface which is substantially parallel to the axis of said cord throughout the length of said sleeve and having a wall provided with a plurality of axially spaced-apart apertures which pass at least partially through said wall from said outer surface with the width of the space between adjacent apertures decreasing progressively so that said apertures progressively increase the flexibility of said sleeve with increasing axial distance from one end of said sleeve toward the other.

2. A member as specified in claim 1, wherein said apertures are discrete areas of said sleeve spaced axially therealong, at each of which areas the wall thickness of said sleeve is at least substantially reduced.

3. A member as specified in claim 2, wherein said spacing between said areas progressively diminishes with increasing axial distance from said one end of said sleeve.

4. A member as specified in claim 3, wherein said spacing between said areas varies as an inverse logarithmic function of the distance from said one end of said sleeve.

5. A member as specified in claim 2, wherein the size of said areas progressively increases with increasing axial distance from said one end of said sleeve.

6. A member as specified in claim 5, wherein the size of said areas increases as a logarithmic function of the distance from said one end of said sleeve.

7. A member as specified in claim 2, wherein said areas are openings through said wall of said sleeve.

8. In combination, a flexible electrical conductor cord and a bending strain-relieving member tightly surrounding said cord, said member comprising a reinforcing sleeve of flexible, resilient material having an outer surface which is substantially parallel to the axis of said cord throughout the length of said sleeve and having a wall provided with a plurality of axially spaced-apart aperture means with the width of the space between adjacent ones of said means decreasing progressively so that said means progressively increase the flexibility of said sleeve with increasing axial distance from one end of said sleeve toward the other.

9. A combination as specified in claim 8, wherein said sleeve is positioned on said cord so that said one end lies at a point of attachment of said cord, and wherein said means progressively increase the flexibility of said sleeve with increasing distance along said cord from said point.

10. A combination as specified in claim 9, wherein said means are discrete areas of said sleeve spaced axially therealong, at each of which areas the wall thickness of said sleeve is at least substantially reduced.

11. A combination as specified in claim 10, wherein said spacing between said areas progressively diminishes with increasing distance along said cord from said point.

12. A combination as specified in claim 11, wherein said spacing between said areas varies as an inverse logarithmic function of the distance along said cord from said point.

13. A combination as specified in claim 10, wherein the size of said areas progressively increases with increasing distance along said cord from said point.

14. A combination as specified in claim 13, wherein the size of said areas increases as a logarithmic function of the distance along said cord from said point.

15. A combination as specified in claim 10, wherein said areas are openings through said wall of said sleeve.

References Cited
UNITED STATES PATENTS

| | | | |
|---|---|---|---|
| 2,727,088 | 12/1955 | LaWall | 174—135 |
| 3,032,737 | 5/1962 | Rottmann | 339—101 |
| 3,093,432 | 6/1963 | King | 339—101 X |
| 3,395,244 | 7/1968 | Koehler | 174—135 |

LARAMIE E. ASKIN, Primary Examiner

U.S. Cl. X.R.
339—101